United States Patent
Pecher et al.

(10) Patent No.: US 7,650,254 B2
(45) Date of Patent: Jan. 19, 2010

(54) METHOD FOR THE DETECTION AND QUANTITATIVE EVALUATION OF A BALANCE ERROR IN A SHAFT-BEARING SYSTEM

(75) Inventors: Alfred Pecher, Stadtlauringen (DE); Stefan Glück, Schweinfurt (DE); Joachim Hering, Würzburg (DE)

(73) Assignee: Schaeffler KG (DE)

( * ) Notice: Subject to any disclaimer, the term of this patent is extended or adjusted under 35 U.S.C. 154(b) by 0 days.

(21) Appl. No.: 10/544,507

(22) PCT Filed: Feb. 4, 2004

(86) PCT No.: PCT/DE2004/000183

§ 371 (c)(1),
(2), (4) Date: May 17, 2006

(87) PCT Pub. No.: WO2004/070340

PCT Pub. Date: Aug. 19, 2004

(65) Prior Publication Data

US 2006/0235628 A1 Oct. 19, 2006

(30) Foreign Application Priority Data

Feb. 7, 2003 (DE) ................................ 103 05 067

(51) Int. Cl.
*G01L 5/00* (2006.01)
(52) U.S. Cl. ............................ 702/113; 702/42; 73/593; 384/448
(58) Field of Classification Search .................. 702/33, 702/34, 35, 41, 42, 43, 44, 46, 113, 173; 73/593; 384/448
See application file for complete search history.

(56) References Cited

U.S. PATENT DOCUMENTS

| 3,685,342 A | * | 8/1972 | Gordon ........................... 73/9 |
| 3,697,841 A | * | 10/1972 | Nystuen ...................... 318/749 |
| 4,027,539 A | * | 6/1977 | Halloran ....................... 73/465 |
| 4,161,666 A | * | 7/1979 | Bacsanyi et al. ............... 310/27 |
| 4,203,319 A | * | 5/1980 | Lechler .................. 73/862.541 |
| 4,464,935 A | * | 8/1984 | McHugh ...................... 73/660 |

(Continued)

FOREIGN PATENT DOCUMENTS

EP 0 969 274 A 1/2000

OTHER PUBLICATIONS

Inetrnational Search Report PCT/DE2004/00183 dated Jun. 17, 2004.

*Primary Examiner*—Jeffrey R West
(74) *Attorney, Agent, or Firm*—Ostrolenk Faber LLP

(57) ABSTRACT

A method for detection and quantitative evaluation of a balance error occurring in a component-bearing system. Static and dynamic forces acting upon the bearing are determined by sensors of a measuring bridge, which are disposed on a rolling bearing and which change the inherent electrical resistance according to the applied pressure, and are made available for analysis in a computer in the form of a periodic test signal that is common to both forces. In order to analyze the test signal, the weighted average of the modulation frequency generated by a balance error and the weighted mean variance thereof are determined from the test signal. The variance is then compared with a given variance threshold value. A variance lying below the variance threshold value is considered to be an indication of a significant balance error in the bearing.

14 Claims, 7 Drawing Sheets

U.S. PATENT DOCUMENTS

| | | | |
|---|---|---|---|
| 4,666,315 A * | 5/1987 | Scranton | 384/1 |
| 4,700,117 A * | 10/1987 | Giebeler et al. | 388/814 |
| 4,941,105 A * | 7/1990 | Marangoni | 702/42 |
| 5,001,931 A * | 3/1991 | Nishimoto et al. | 73/587 |
| 5,140,849 A * | 8/1992 | Fujita et al. | 73/593 |
| 5,677,488 A * | 10/1997 | Monahan et al. | 73/593 |
| 5,905,212 A * | 5/1999 | Moses et al. | 73/862.451 |
| 6,013,991 A * | 1/2000 | Philipp | 318/139 |
| 6,490,935 B1 * | 12/2002 | Joki et al. | 73/862.49 |
| 6,619,102 B2 * | 9/2003 | Salou et al. | 73/11.07 |
| 6,687,623 B2 * | 2/2004 | Bailey et al. | 702/42 |
| 6,766,697 B1 * | 7/2004 | Perez et al. | 73/800 |
| 2003/0001445 A1 * | 1/2003 | Paden et al. | 310/90.5 |

* cited by examiner

METHOD FOR THE DETECTION AND QUANTITATIVE EVALUATION OF A BALANCE ERROR IN A SHAFT-BEARING SYSTEM

CROSS REFERENCE TO RELATED APPLICATION

The present application is a 35 U.S.C. §§ 371 national phase conversion of PCT/DE2004/000183, filed 4 Feb. 2004, which claims priority of German Application No. 103 05 067.1, filed 7 Feb. 2003. The PCT International Application was published in the German language.

AREA OF APPLICATION OF THE INVENTION

The invention relates to a method for the detection and quantitative evaluation of a balance error occurring in a shaft/bearing system, using sensors on the bearing which change electrical resistance due to pressure thereon. A method of this type can advantageously be used where rotating bodies have balance errors which have to be eliminated in order to increase the lifetime of a component/bearing system.

BACKGROUND OF THE INVENTION

It is generally known to equip antifriction bearings with measuring devices for detecting the forces acting on the bearing. For example, DE 27 46 937 A1 shows a force measuring bearing in which strain gages are fixed in a peripheral groove in a stationary bearing outer ring and are connected to other electric resistances in an electric measuring bridge. When the antifriction elements of the bearing roll over the fixing locations of such strain gages, which change their resistance as a function of strain, a substantially sinusoidal measured signal is generated, which can be analyzed by a suitable evaluation device.

In addition to the determination of the forces acting on the antifriction bearing, there is a need for information as to whether and to what extent a component held by the bearing has a balance error. Balance errors of this type arise, for example in the case of drive shafts, entirely as a result of irregular wall thicknesses of the cylindrical shaft wall or as a result of eccentric fixing of a shaft flange to the shaft tube. Furthermore, a nonuniform welded seam can also cause a balance error on such a drive shaft. The avoidance or compensation of such balance errors is primarily of great economic significance because these act on the bearing and, depending on the magnitude of the balance error, that is to say on the level of the incorrect mass distribution, and the rotational speed, these lead more or less quickly to permanent bearing damage, which can ultimately cause the total failure of a machine.

In order to avoid balance errors of this type, the rotatable components are normally clamped into a balancing device at the end of the production process and checked there for the presence of balance errors. As soon as the location of the balance error and its magnitude has been determined, the balance error can be eliminated, for example by fitting additional masses (also called canceling masses) or by the removal of the mass causing the balance error.

In addition to the balance error induced by the production process, balance errors can also occur in rotatably mounted bodies during their use, however. For example, in a case of a drive shaft used in a dirty fabrication area, balance errors induced by operation can arise from the fact that, over the course of time, dirt accumulates at different points on the shaft surface and an unbalanced weight of the rotating masses is established. In another case, for example, as a result of an object rubbing periodically in an undesired manner on the drive shaft, over the course of time material can be removed from the surface of the drive shaft at a specific point, which likewise leads to an unbalanced weight of the rotating masses and therefore to a balance error.

The disadvantage when operation-induced balance errors occur is that these generally cannot be detected immediately and unambiguously. Instead, it is usual that such an operation-induced balance error is only detected by the failure of one of the bearings in which the body is mounted. When such bearing damage has occurred, it is often necessary for an entire system to be stopped for a bearing change, which leads to considerable production failure-induced costs.

In order to detect a balance error in a rotatably mounted component, it is known to arrange for a measured signal generated by strain gages on the bearing to run through a frequency filter, which separates a carrier frequency from a modulation frequency of the measured signal. In the process, the undistorted sinusoidal measured signal oscillation caused by the antifriction elements rolling over periodically is viewed as the carrier frequency, while the forces acting on the sensors of the bearing because of the balance error are designated the modulation frequency.

The disadvantage with this known method is that, in the event of a change in the modulation frequency, for example because of a change in the rotational speed of the component, the frequency filter also has to be readjusted accordingly with regard to its filter characteristics. This can be implemented in practice only in the case of digitally operating frequency filters, but is associated with considerable and therefore time-consuming computational effort. For this purpose, what are known as "observers", which are based on specific mathematical functions, are often readjusted adaptively. However, with regard to the analytical method applied there, attention must be paid during the readjustment of such frequency filters, to results that are also still plausible and that can be achieved. As a rule, this is made more difficult by the fact that such digital filters have a transient response which has a detrimental influence on the speed of detection and accuracy of detection with regard to the balance error to be determined.

Another method for determining the balance error of a rotatably mounted body likewise starts from the aforementioned amplitude-modulated measured signal, in which the determination of the magnitude of the frequency response of the balance error is carried out by means of a Fourier transformation. However, since the Fourier transformation includes an averaging process, in the event of a rapid change in the rotational speed of the component, the assignment of spectral components which allow conclusions to be drawn about the balance error is difficult to carry out. In addition, the resolution of the magnitude spectrum is determined by the length of the time interval which can be used for the transformation. Measured signal analyses for determining balance errors by means of the Fourier transformation can therefore as a rule only be carried out off-line, that is to say with a time delay, because of the necessary calculation steps. This is primarily disadvantageous in the case of balance errors which arise as a result of operation, since these arise in a completely unsuspected manner and can build up quickly with a destructive effect.

OBJECT OF THE INVENTION

Against this background, the object of the invention is to put forward a method with which the production and presence of balance errors in rotatably mounted bodies can be detected easily, quickly and without direct inspection, so that, for example, balance errors caused by operation can be eliminated quickly and specifically and bearing damage can be avoided.

SUMMARY OF THE INVENTION

The invention is based on the finding that the measured signal of a measuring bearing known per se having pressure-sensitive sensors changing their electric resistance can also be used to determine the presence of a balance error and also the rotational frequency of a balance error of a component carried in the bearing. Such a component produces a load in the bearing which has a static component and, in the event of the presence of a balance error, also has a dynamic component. The two load components are contained in the measured signal, the signal component belonging to the static load having the dynamic load component superimposed on it and therefore leading to amplitude modulation of the sensor signal.

In order to evaluate such an amplitude-modulated measured signal, the dynamic amplitude changes are examined in more detail. During this analysis of the measured signal, the period and frequency of the oscillation produced in the measured signal by a balance error, and also their variance, are determined. The variance is then compared with a predefined variance threshold value, the fact that this value falls below the threshold value being assessed as a pointer to a significant balance error in the bearing.

Accordingly, the invention relates to a method for the detection and quantitative determination of a balance error of a component mounted in an antifriction bearing, in which, with the aid of sensors arranged on the antifriction bearing and changing their electric resistance as a function of pressure, the static and dynamic forces acting on the bearing are measured and, in the form of a periodic measured signal common to the two forces, are made available to a computer for the analysis of the signal waveform. In this method, the following method steps are preferably provided:
  determining the minimum and maximum amplitudes (signal excursions) of the respective periods of the measured signal,
  freeing the curve of the minimum and maximum signal excursions from the component of the static force acting on the bearing,
  determining the balance error periods from the curve of the minimum and maximum signal excursions of the dynamic force component by means of interpolation over time, and
  detecting the presence of a balance error if these balance error periods determined by means of the interpolation exhibit low statistical scatter.

By means of this method sequence, even with a comparatively small evaluation device, such as a microcomputer, a balance error which acts on a component held in a bearing can be detected in real time.

As opposed to known methods, it is therefore possible for the production of even very small balance errors on rotatably mounted components to be determined very early and very cost-effectively. This is primarily of particular advantage when the balance errors occur suddenly and are induced by operation. It is precisely in such cases that threatening bearing damage can be detected very quickly and efficiently and can be avoided by stopping the rotating component. In this way, considerable costs can be saved, which would arise as a result of a bearing failure with subsequent bearing replacement and any production stoppage. Instead, in most practical cases, it will be sufficient, for example, to remove from a bearing-mounted shaft operating aids or product constituents adhering continuously or suddenly to this shaft.

If the measured signal from the aforementioned sensors or the measuring bridge is a measured signal affected by an offset, this measured signal is freed of the offset value before the first method step enumerated. This is preferably carried out by means of an adaptive-recursive estimation of the average.

In another refinement of the method according to the invention, provision is additionally made for the freeing of the curve of the minimum and maximum measured signal excursions from the component of the static force acting on the bearing likewise to be carried out by means of an adaptive-recursive estimation of the average.

In order to carry out this adaptive-recursive estimation of the average, use is preferably made of the equation for the estimated average $$E\{X\}(k+1)=E\{X\}(k)+c_x[x(k+1)-E\{X\}(k)] \qquad [\text{Eq. 1}]$$

in which $E\{X\}(k+1)$ indicates the expected value for the weighted arithmetic average, and $E\{X\}(k)$ indicates the instantaneous expected value of a weighted arithmetic average X, while k represents the index, x a digital sampled value of the measured signal or the measured signal excursions and c represents an adaptation constant.

For the statistical evaluation, a determination of the variation of the oscillation periods caused by the balance error is carried out, in which use is made of the adaptive-recursive equation for the estimated average variation $$E\{X^2\}(k+1)=E\{X^2\}(k)+c_x^2[x^2(k+1)-E\{X^2\}(k)] \qquad [\text{Eq. 2}]$$

in which $E\{X^2\}(k+1)$ represents the expected value of the weighted arithmetic average of second order, and $E\{X^2\}(k)$ represents the instantaneous expected value of second order, while k represents an index, x a value for the determined period of the balance error and c an adaptation constant.

The location of the balance error on the component rotatably mounted in the antifriction bearing may be determined by the method according to the invention in that, given a known physical arrangement of the sensor on the antifriction bearing, the time of occurrence of a dynamic measured signal amplitude brought about by the balance error marks the location of the balance error on the component.

BRIEF DESCRIPTION OF THE DRAWINGS

The invention will be explained with the aid of a practical exemplary embodiment, which is illustrated in the appended drawing, in which.

DETAILED DESCRIPTION OF THE DRAWINGS

Figure 1:
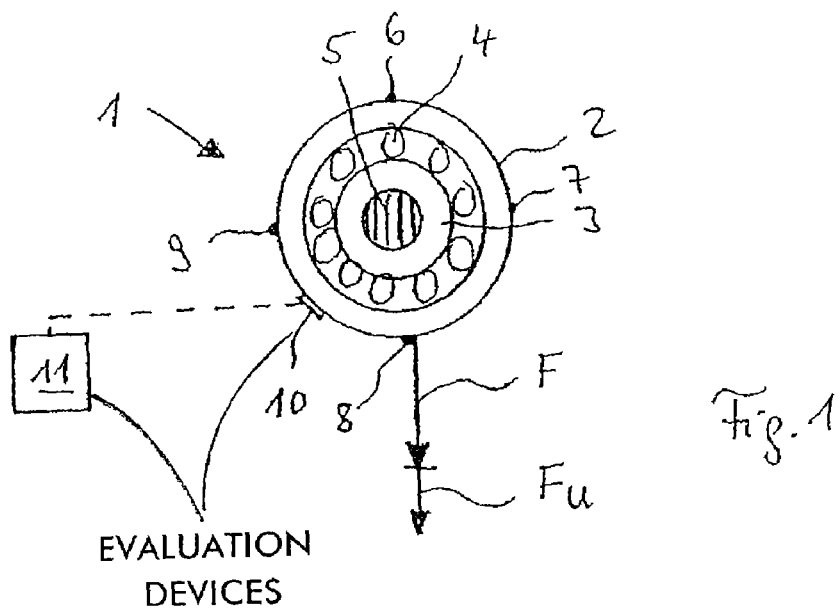
FIG. 1 shows a schematic cross section of a measuring bearing with a component having a balance error mounted therein.

FIG. 1 accordingly shows a measuring bearing 1 which comprises a stationary outer ring 2 and a rotatable inner ring 3, between which antifriction elements 4 are arranged. While the inner ring 3 holds and mounts a cylindrical component 5, sensors which change their electric resistance as a function of pressure are fixed on the outside of the bearing outer ring 2 in measuring bridges 6, 7, 8, 9. The sensors of the measuring bridges 6, 7, 8, 9 in this exemplary embodiment are strain-dependent resistors, which are connected to one another in a manner known per se. However, piezoelectric pressure sensors can also expediently be used. The arrangement of the measuring bridges of FIG. 1 is an exemplary embodiment and can be varied as desired and/or the number of measuring bridges can be changed.

The output signal from the measuring bridges 6, 7, 8 or 9 (see FIG. 8, 801, 802) is passed on to an evaluation device 10, which is preferably formed as a microcomputer fixed to the bearing outer ring 2. The evaluation device 10 in each case determines values from the output signal from the measuring bridges 6, 7, 8, 9 from which, in detail and in real time, it is possible to draw conclusions about the production or the presence of a balance error on the rotatably mounted component 5. However, it is also possible for the evaluation device 10 to perform only part of the calculation work and, in this regard, to send intermediate values to a more powerful computer 11, which is arranged outside the bearing 1 and which is connected to the evaluation device 10 via data lines. In any case, by means of the evaluation device or devices 10, 11, a balance error in the rotatably mounted component 5 can be determined and indicated by using the method according to the invention.

Figure 2:
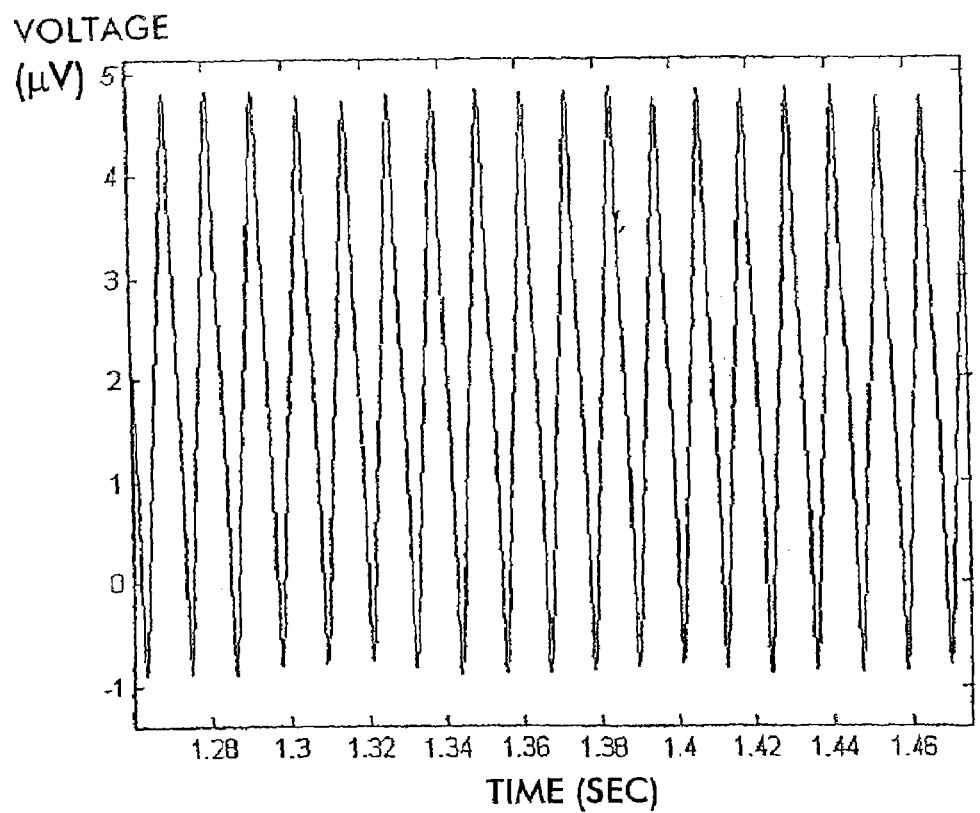
FIG. 2 shows the curve of the measured signal from the sensors of the bearing according to FIG. 1.

As FIG. 2 shows, the measuring bridges 6, 7, 8 or 9 preferably arranged on the stationary bearing outer ring 2 generate a substantially sinusoidal measured signal as the antifriction elements 4 roll over their fixing locations, the characteristic change in said measured signal over time being illustrated in this figure for the case of a static force $F_S$ of 10 kN. Since a balance error acts on the components 5, the signal waveform also reproduces the fact that the amplitudes do not always reach the same maximum or minimum value. The respective difference between the minimum and maximum amplitude values can be attributed to the fact that the force $F_U$ of 0.25 kN in this example, produced by the balance error, is passed on to the bearing outer ring 2 via the bearing inner ring 3 and the antifriction elements 4. In this case, the dynamic balance error force $F_U$ and the static bearing force $F_S$ are superimposed, the latter acting on the bearing 1 and therefore on the measuring bridge 8 even in the case of a balanced component 5 or nonrotating component 5, because of the force of gravity oriented vertically downward. This superimposition of forces $F_S+F_U$ can therefore in principle be registered and evaluated by measurement.

As the signal waveform illustrated in FIG. 2 shows, this has superimposed on it an offset value of about 2 μV, which is caused by the measuring system used with nonoffset-compensated measuring bridges. Therefore, following the registration of the measured signal, in the next method step this is freed of the aforementioned offset value, (see FIG. 9, 902). This method step can be dispensed with if use is made of sensors or measuring systems which already supply an offset-compensated measured signal, (see FIG. 9, 901).

In order to prepare for the offset compensation, the measured signal shown in FIG. 2 is firstly digitized, in order to then subject a digital measured signal step-by-step online to an adaptive-recursive estimation of the average. In the process, the digital value that is present is weighted with an average obtained from chronologically later digital values.

The term "adaptive-recursive estimation of the average" means that resultant values from the first average calculation are incorporated in the calculation of the next average. This permits a consistent estimation of the signal amplitude on the basis of only one new sampled value in each case, without a high storage and computing capacity having to be kept in reserve in an electronic evaluation device 10, 11.

Figure 3:
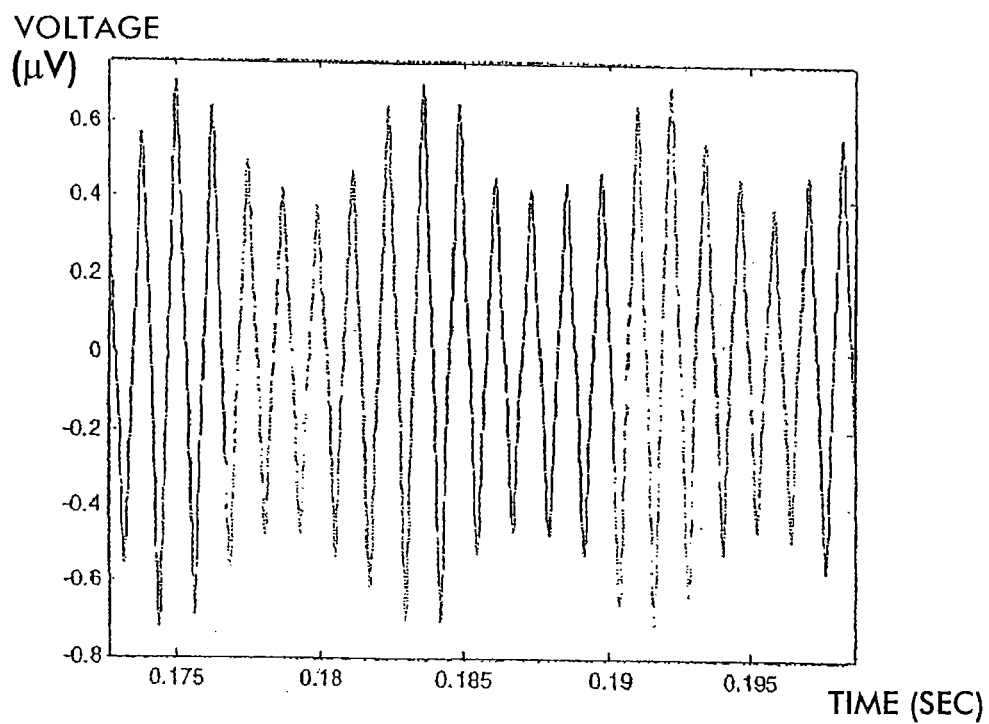
FIG. 3 shows the curve of the measured signal after it has been freed of the offset component of the measuring system.

The determination of the weighted arithmetic average is accordingly carried out with the aid of the recursive basic equation $$E\{X\}(k+1)=E\{X\}(k)+c_x[x(k+1)-E\{X\}(k)] \qquad [\text{Eq. 1}]$$

in which $E\{X\}(k)$ indicates the instantaneous expected value of the weighted arithmetic average X, while k represents the index, x a digital sampled value of the measured signal and c represents an adaptation constant. The estimated instantaneous average $E\{X\}(k)$ is subtracted from the current sampled value of the sensor signal at each sampling time, so that a measured signal waveform freed of the offset and illustrated in FIG. 3 is produced.

Here, the adaptation constant c is a value which is less than one and greater than zero and can be calculated from the equation for what is known as the adaptation rate $$t=\{1/c_x-1/2\}\cdot T \qquad [\text{Eq. 3}]$$

Here, t indicates how quickly the true average can be determined with a tolerable error rate, while T represents the time interval between two adjacent sampled values.

Figure 8:
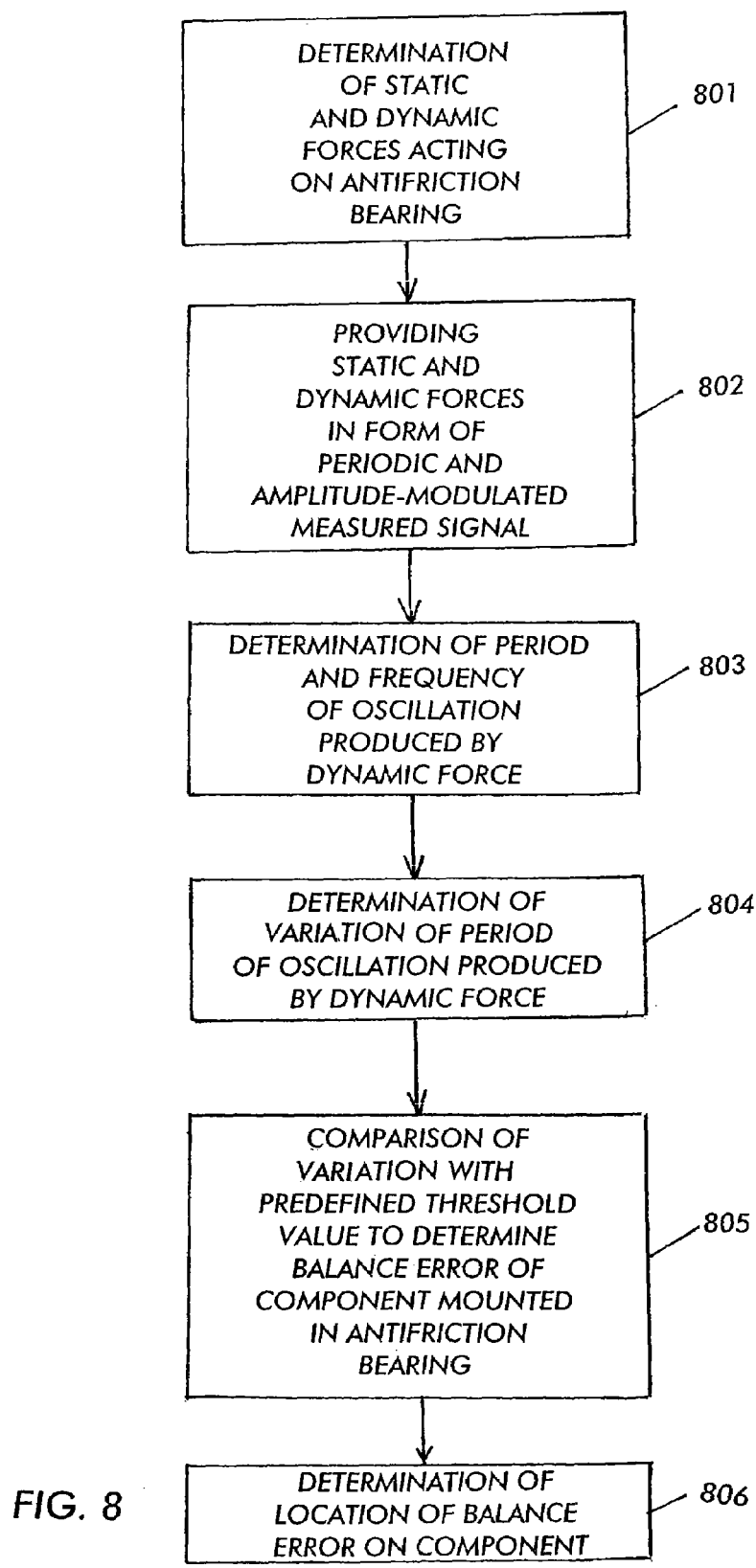
FIG. 8 shows general method steps for the determination of the balance error.
Figure 9:
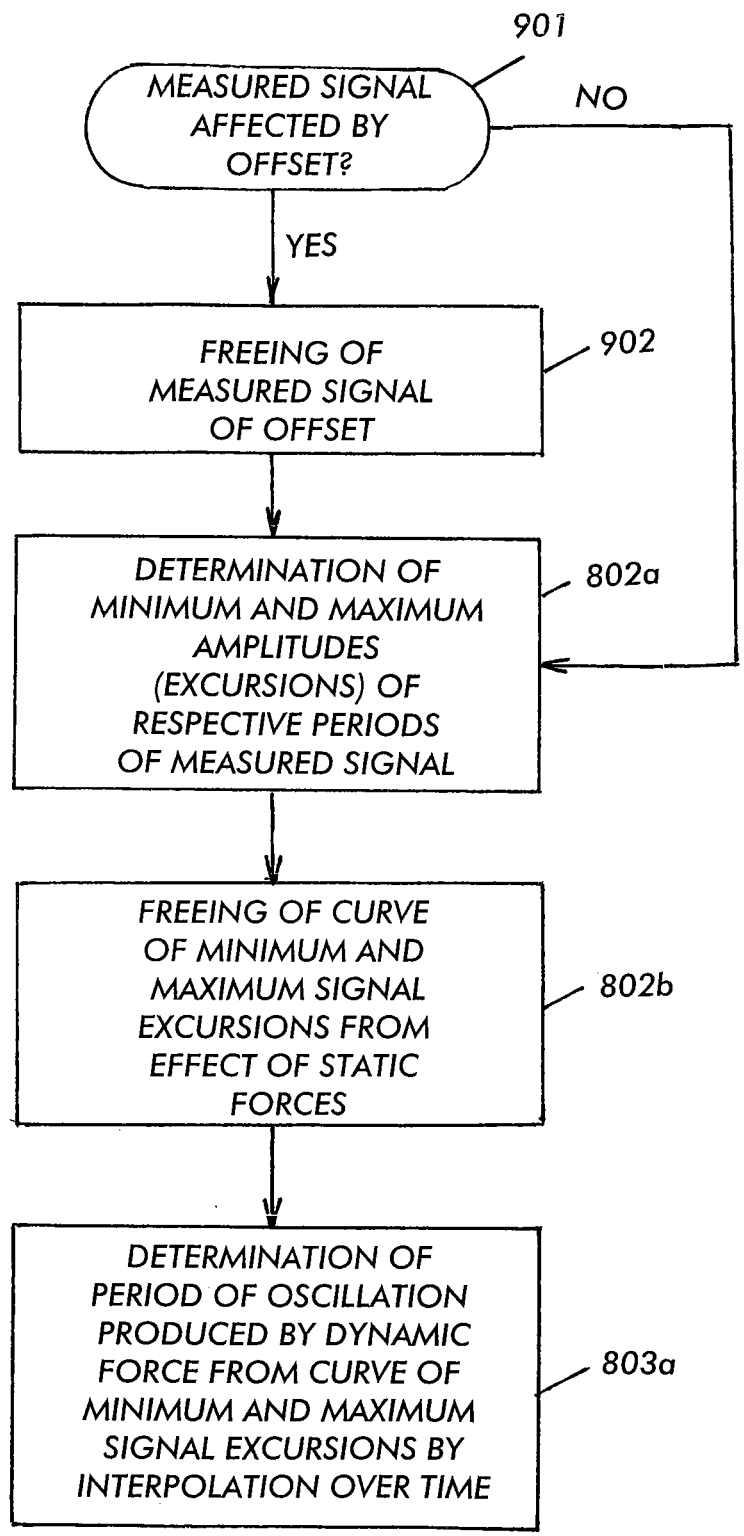
FIG. 9 shows additional and detailed method steps for the determination of the balance error.
Figure 10:
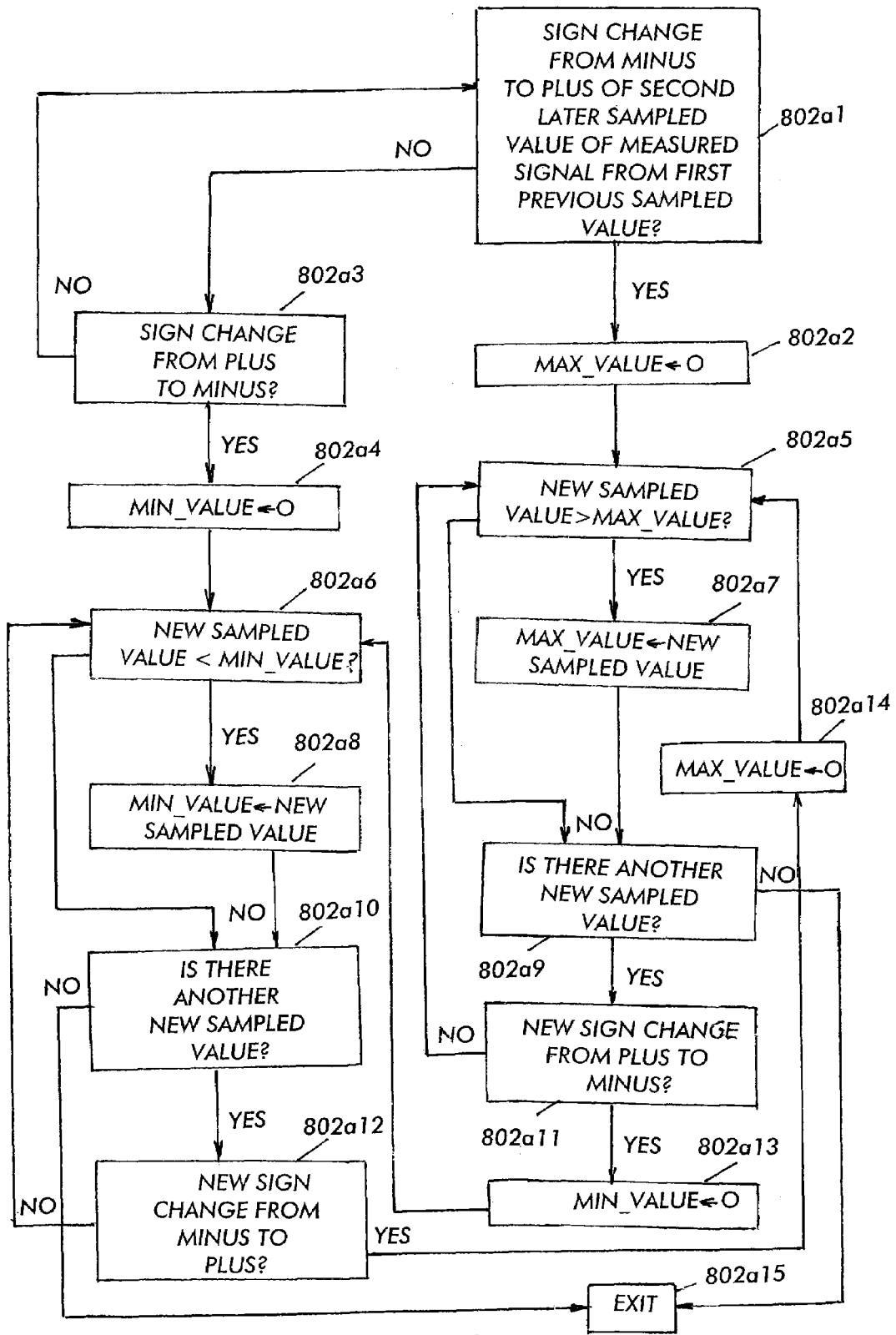
FIG. 10 shows detailed method steps included in the method step labeled 802a in FIG. 9.

Then, what are known as the signal excursions, that is to say the maximum and minimum amplitudes of the measured value per period, are determined for an oscillation period, (see FIG. 8, 803; FIG. 9, 802a). In this case, the current sampled value of the measured signal is compared with the previous sampled value. In the event of a sign change from minus to plus, a register $\max_{13}$ value for storing the maximum value of a period is set to zero in the evaluation device, (see FIG. 10. 802a1, 802a2). Then, during the following comparison calculations, as soon as a sampled value is greater than the register content, the new sampled value is stored in this register max_value, (see FIG. 10, 802a5, 802a7). In this way, the register content for the maximum value is renewed with positive amplitude values that become greater and greater until a new sign change of the measured signal from plus to minus takes place, (see FIG. 10, 802a11). At this time, the maximum of the positive half wave of a period of the measured signal has safely been detected.

After that, the determination of the minimum value min_value of the negative half wave of the measured signal which then follows is carried out in the same way, (see FIG. 10, 802a3, 802a4, 802a6, 802a8). After a new sign change from minus to plus has been reached, (see FIG. 10, 802a12, 802a14), the signal excursions of the period have been examined, and therefore the total force present at the measuring location, which is composed of the dynamic component $F_U$ caused by the balance error and the static component $F_S$, is calculated from the difference between the stored maximum and minimum values. This procedure for offset compensation is continued continuously over time. In this way, the signal excursions and the amplitudes of the total force $F_S+F_U$ are determined for each period of the measured signal, (see FIG. 10, 802a9, 802a10, 802a15), and the signal excursions are illustrated by way of example in FIG. 4.

Figure 4:
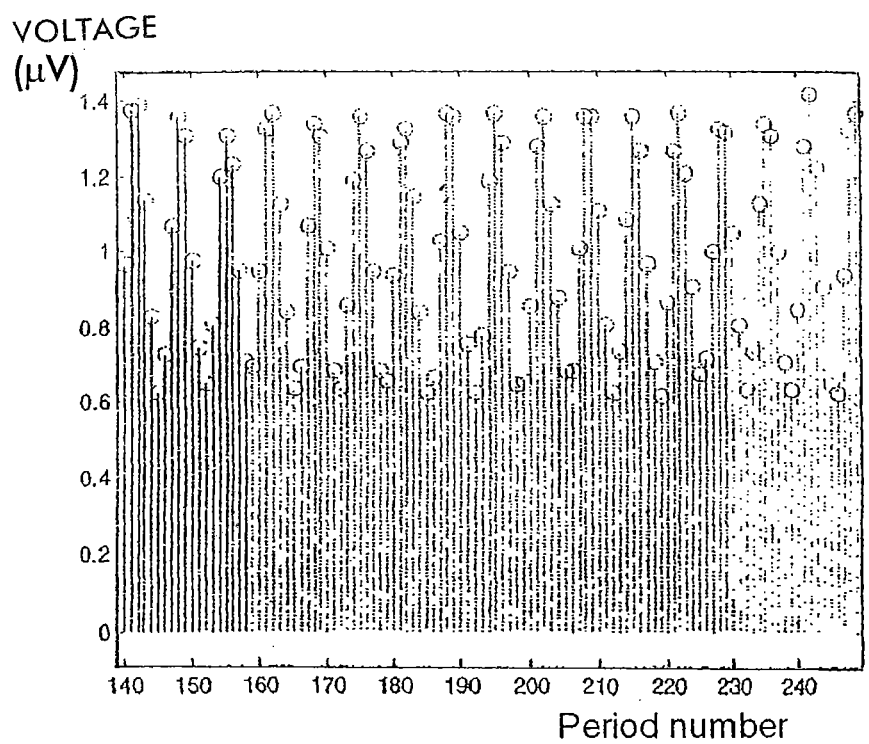
FIG. 4 shows a curve of the measured signal excursions for each period of the measured signal according to FIG. 3.

To determine the presence of a balance error, in a next step, the component of the static force $F_S$, which can be viewed as a second offset value here, is removed from the signal excursion curve of FIG. 4 freed of the offset, (see also FIG. 9, 802b). In the example illustrated in FIG. 4, this second offset value lies around the value of 1 μV, around which the dynamic signal excursion values fluctuate. If these measured signal excursion values influenced by the balance error are freed of this second offset value by means of a renewed adaptive-recursive average calculation in accordance with the equation mentioned above [Eq. 1], then the curve of an oscillation around the zero point, illustrated in FIG. 5, is obtained, which is correlated with the rotational speed of the rotatably mounted component 5 in the presence of a balance error.

Figure 5:
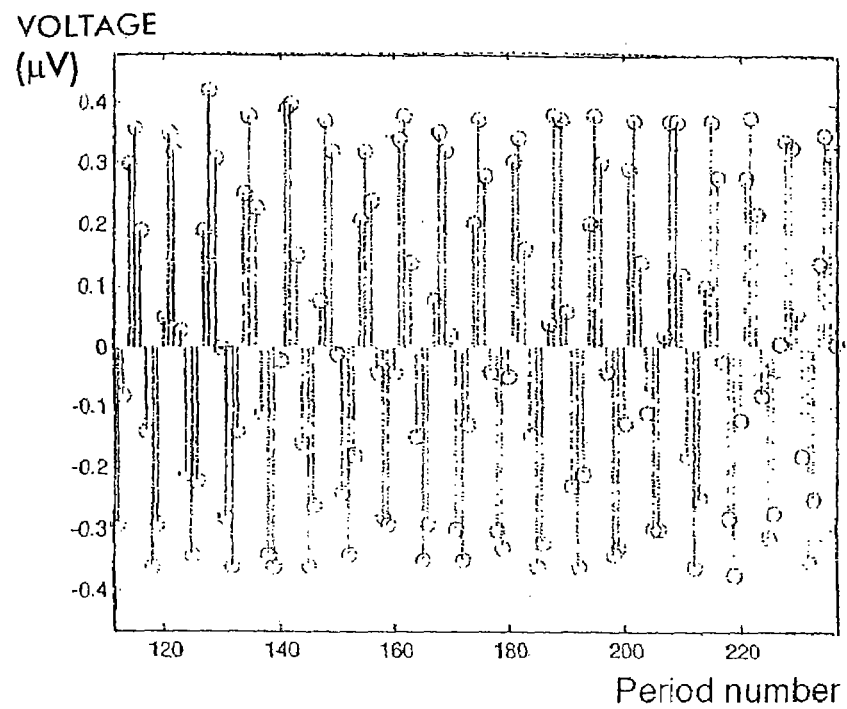
FIG. 5 shows an oscillation period cleaned of the static component of the measured signal excursions according to FIG. 4.
Figure 6:
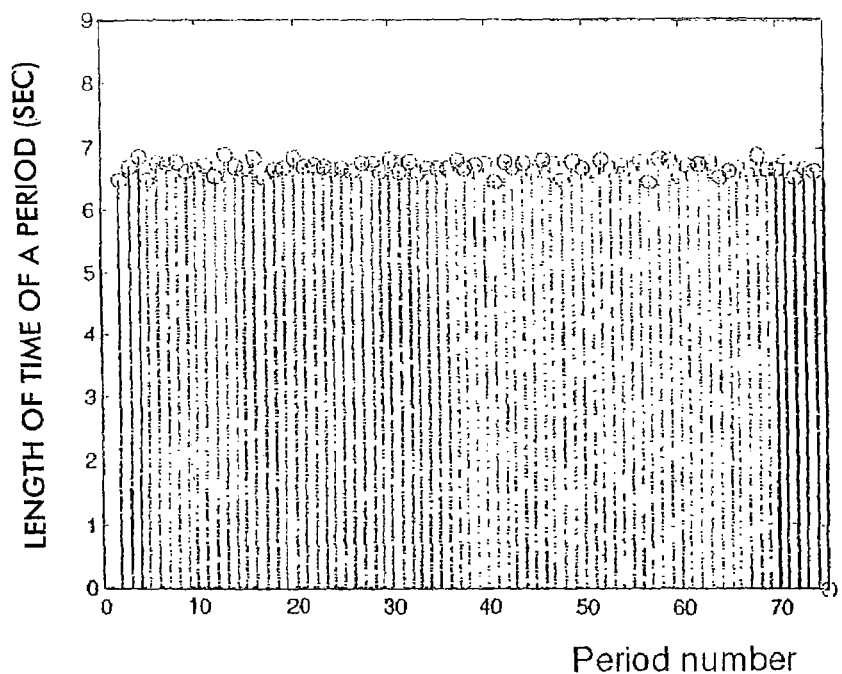
FIG. 6 shows an oscillation period curve according to FIG. 5 following an interpolation in the time direction.

Subsequent interpolation of this amplitude curve of the balance error oscillation according to FIG. 5 leads to an oscillation period distribution illustrated in FIG. 6, (see also FIG. 9, 803a). If the distribution of the individual periods is linked with a value with a low statistical scatter which, moreover, is correlated with the actual rotational speed of the component, the presence of a balance error can be detected reliably from this. In the present example, it can be assumed that there is a balance error.

For the purpose of better understanding, it should be pointed out that, during the interpolation in the time direction in the computational model, the peaks of the sampled values according to FIG. 5 describe a continuous curve, from whose points of intersection with the abscissa or with the zero line, by means of a three-part calculation, the period is calculated from the amplitude values and the time values of the last positive sampled value before a point of intersection and after this point of intersection.

By means of a subsequent statistical evaluation of the calculated values illustrated in FIG. 6, the variation of a balance error period from FIG. 5 is reached, (see also FIG. 8, 804). The weighted average of the variation is calculated with the aid of the recursive basic equation $$E\{X^2\}(k+1)=E\{X^2\}(k)+c_x^2[x^2(k+1)-E\{X^2\}(k)] \quad [\text{Eq. 2}]$$

in which $E\{X^2\}(k+1)$ represents the expected value of the weighted arithmetic average of second order, and $E\{X^2\}(k)$ represents the instantaneous expected value of second order, while k represents an index, x a value for the determined period of the balance error and c an adaptation constant.

Figure 7:
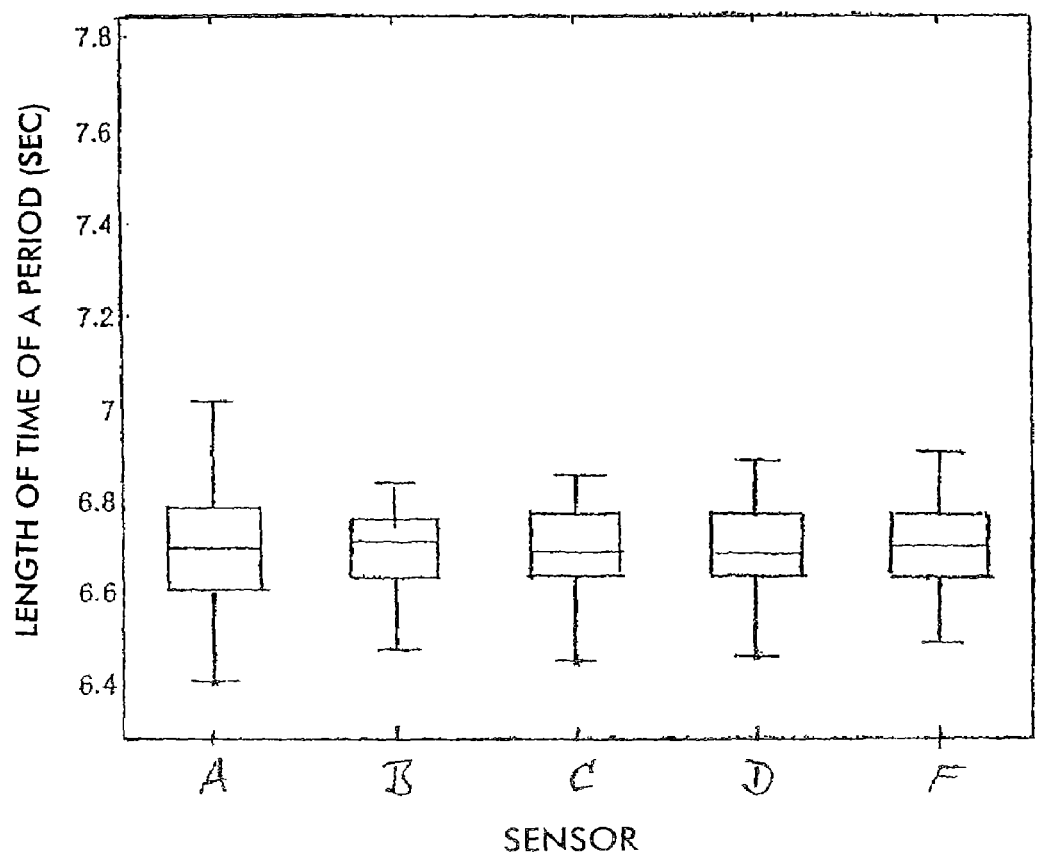
FIG. 7 shows a statistical representation of balance error periods determined from five sensors A to E in what is known as a box plot.

If a great range of scatter around the calculated period average is detected, this points to the fact that there is no balance error, while a low variation around the period average points to a balance error on the rotatably mounted component. Thus, FIG. 7 shows by way of example the calculated period averages of the measured signals from five different sensors A to F, which were used in five different balance error verification trials. Although the balance errors detected during these trials are pronounced to different extents, they still lie below a balance error threshold previously determined empirically, (see FIG. 8, 805). The location of the balance error on the component may be determined based on a known physical arrangement of the sensors on the bearing, a time of occurrence of a fall of the determined variation of the periods of the oscillation produced by the dynamic force below the predefined variation threshold value, marking the location of the balance error on the component, (see FIG. 8, 806).

With the method according to the invention, balance error measurements were carried out which showed that even very small balance errors could be determined under real-time conditions.

The invention claimed is:

1. A method for determination of a balance error of a component mounted in an antifriction bearing, wherein the antifriction bearing includes a ring attached to the component, another ring and rolling elements between the rings and includes sensors arranged on the antifriction bearing in measuring bridges, wherein the sensors change their respective electric resistances as a function of pressure on the sensors;

the method comprising:

determining static and dynamic forces acting on the antifriction bearing with the sensors and the bridges and providing the determined forces to an evaluation device for analysis, wherein the determined forces are provided in the form of a periodic and amplitude-modulated measured signal which is common to both the static and dynamic forces;

determining periods and frequencies of an oscillation produced by the dynamic force and determining a variation of the periods of the oscillation produced by the dynamic force, comparing the determined variation with a predefined variation threshold value, such that when the determined variation falls below the predefined variation threshold value, it is assessed as an indication of a balance error of the component mounted in the antifriction bearing;

determining minimum and maximum signal amplitudes of the periods of the measured signal; and freeing a curve of the minimum and maximum signal amplitudes from an effect of the static force acting on the antifriction bearing, and wherein the step of determining the periods of the oscillation produced by the dynamic force includes determining the periods from the curve of the minimum and maximum signal amplitudes, which has been freed from the effect of the static force acting on the antifriction bearing, by interpolation over time.

2. The method as claimed in claim 1, further comprising, in the presence of the measured signal affected by an offset, freeing the measured signal of its offset value before performing method step (a).

3. The method as claimed in claim 2, wherein the freeing of the measured signal of the offset before step (a) is performed by an adaptive-recursive estimation of an average of digital sampled values of the measured signal.

4. The method as claimed in claim 3, wherein the adaptive-recursive estimation of the average comprises using an equation $$E\{X\}(k+1)=E\{X\}(k)+c_x[x(k+1)-E\{X\}(k)] \quad [\text{Eq. 1}]$$

in which $E\{X\}(k+1)$ represents the (k+1)th expected value for a weighted arithmetic average, X of the digital sampled values of the measured signal, $E\{X\}(k)$ represents the kth instantaneous expected value of the weighted arithmetic average X of the digital sampled values of the measured signal, k represents an index, with an initial value of zero for a first evaluation of [Eq. 1] and a value increasing by one for each subsequent evaluation of [Eq. 1], x (k+1) represents the (k+1) th digital sampled value of the measured signal and $c_x$ represents an adaptation constant.

5. The method as claimed in claim 4, wherein the adaptation constant $c_x$ has a value which is less than one and greater than zero.

6. The method as claimed in claim 5, wherein the adaptation constant $c_x$ is calculated from an equation for an adaptation rate $$t = \{1/c_x - 1/2\} \cdot T \quad [\text{Eq. 3}]$$

where t indicates how quickly $E\{X\}$ can be determined with a tolerable error rate, while T represents a time interval between two adjacent sampled values.

7. The method as claimed in claim 1, wherein the freeing of the curve of the minimum and maximum signal amplitudes from the effect of the static force acting on the antifriction bearing according to step (b) is performed by an adaptive-recursive estimation of an average of the minimum and maximum signal amplitudes.

8. The method as claimed in claim 7, wherein the adaptive-recursive estimation of the average comprises using the equation $$E\{X\}(k+1) = E\{X\}(k) + c_x[x(k+1) - E\{X\}(k)] \quad [\text{Eq. 1}]$$

in which $E\{X\}(k+1)$ represents the (k+1)th expected value for a weighted arithmetic average X, $E\{X\}(k)$ represents the kth instantaneous expected value of a weighted arithmetic average X, k represents an index with an initial value of zero for a first evaluation of [Eq. 1] and a value increasing by one for each subsequent evaluation of [Eq. 1], x (k+1) represents the (k+1)th value of the minimum and maximum signal amplitudes and $c_x$ represents an adaptation constant.

9. The method as claimed in claim 1, wherein the step of determining the variation of the periods of oscillation produced by the dynamic force comprises an adaptive-recursive calculation for the variation by an equation $$E\{X^2\}(k+1) = E\{X^2\}(k) + c_x^2[x^2(k+1) - E\{X^2\}(k)] \quad [\text{Eq. 2}]$$

in which $E\{X^2\}(k+1)$ represents the (k+1)th expected value of a weighted arithmetic average squared, $X^2$, of a sampled value of the periods of the oscillation produced by the dynamic force, $E\{X^2\}(k)$ represents the kth instantaneous expected value of the square of the weighted arithmetic average, $X^2$, of the sampled value of the periods of the oscillation produced by the dynamic force, while k represents an index, with an initial value of zero for a first evaluation of [Eq. 2] and a value increasing by one for each subsequent evaluation of [Eq. 2], $x^2$ (k+1) represents the (k+1)th sampled value of the periods of the oscillation produced by the dynamic force squared, and $c_x$ represents an adaptation constant.

10. The method as claimed in claim 9, wherein the adaptation constant $c_x$ has a value which is less than one and greater than zero.

11. The method as claimed in claim 10, wherein the adaptation constant $c_x$ is calculated from an equation for an adaptation rate $$t = \{1/c_x - 1/2\} \cdot T \quad [\text{Eq. 3}]$$

where t indicates how quickly $E\{X^2\}$ can be determined with a tolerable error rate, while T represents a time interval between two adjacent sampled values.

12. The method as claimed in claim 1, further comprising determining a location of the balance error on the component that is mounted in the antifriction bearing based on a known physical arrangement of the sensors on the antifriction bearing, a time of occurrence of a fall of the determined variation of the periods of the oscillation produced by the dynamic force below the predefined variation threshold value marking the location of the balance error on the component.

13. The method as claimed in claim 1, wherein determining the minimum and maximum measured signal amplitudes comprises a. comparing a second later sampled value of the measured signal with a first previous sampled value; and in the event of a sign change from minus to plus, setting a register (max_value), for storing a maximum value of the periods, to zero in the evaluation device, and in the event of a sign change from plus to minus, setting a register (min_value), for storing a minimum value of the periods, to zero in the evaluation device, and in the event of no sign change continuing to execute step a;

b. if the register (max_value) is set to zero, conducting subsequent comparison calculations, in which if a new sampled value is greater than the value set in the register ($max_{13}$ value), storing the new sampled value in the register (max_value), and continuing the comparison calculations either until a new sign change from plus to minus takes place at which time the register (min_value), for storing the minimum value of the periods, is set to zero in the evaluation device, or until no new sampled values exist;

c. if the register (min_value) is set to zero, conducting subsequent comparison calculations in which if a new sampled value is less than the value set in the register (min_value), storing the new sampled value in the register (min_value) and continuing the comparison calculations either until a new sign change from minus to plus takes place at which time the register (max_value) is set to zero, or until no new sampled values exist; and d. if the register (max_value) is set to zero, returning to step b in this claim.

14. The method as claimed in claim 13, wherein when a new sign change from minus to plus occurs in step c, the contents of the two registers (max_value, min_value) indicate the maximum and minimum signal amplitudes of the periods for which sampled values of the measured signal have been stored in the two registers (max_value, min_value), the maximum and minimum signal amplitudes corresponding to a sum of the static and dynamic forces acting on the antifriction bearing in a time interval.

\* \* \* \* \*